United States Patent Office 3,390,525
Patented July 2, 1968

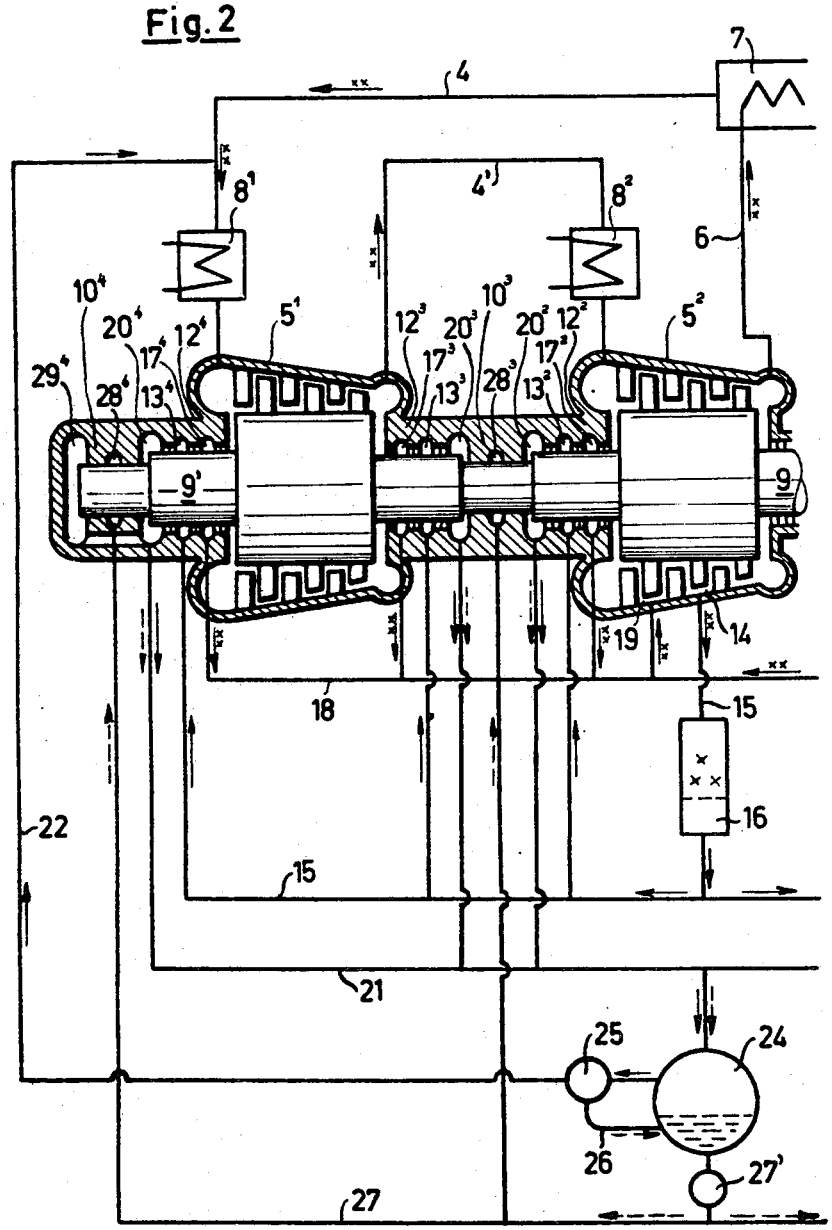

3,390,525
SHAFT-SEALING DEVICE FOR TURBOMA-
CHINES HAVING A GASEOUS WORK-
ING MEDIUM HEATED IN A NUCLEAR
REACTOR
Werner Spillmann, Kilchberg, Switzerland, assignor to
Escher Wyss Aktiengesellschaft, Zurich, Switzer-
land, a corporation of Switzerland
Filed Dec. 27, 1966, Ser. No. 605,046
Claims priority, application Switzerland, Jan. 14, 1966,
510/66
4 Claims. (Cl. 60—59)

ABSTRACT OF THE DISCLOSURE

A turbo-compressor nuclear power plant of the closed circuit type includes a pressure tight housing through which a rotary shaft extends. Leakage between the shaft and housing is prevented by a shaft bearing mounted in pressure tight relation to the housing. A labyrinth gland is also mounted in pressure tight relation to the housing and is located between the bearing and the rotary turbine and compressor. The gland is divided into two parts by an encircling chamber. There is a second chamber between the bearing and the gland. An extension conduit extends from the compressor through an isotope trap to the first chamber. A return conduit, provided with a lubricant trap, extends from the second chamber to the closed circuit at a point where the pressure is lower than that in the second chamber.

---

Figure 1:
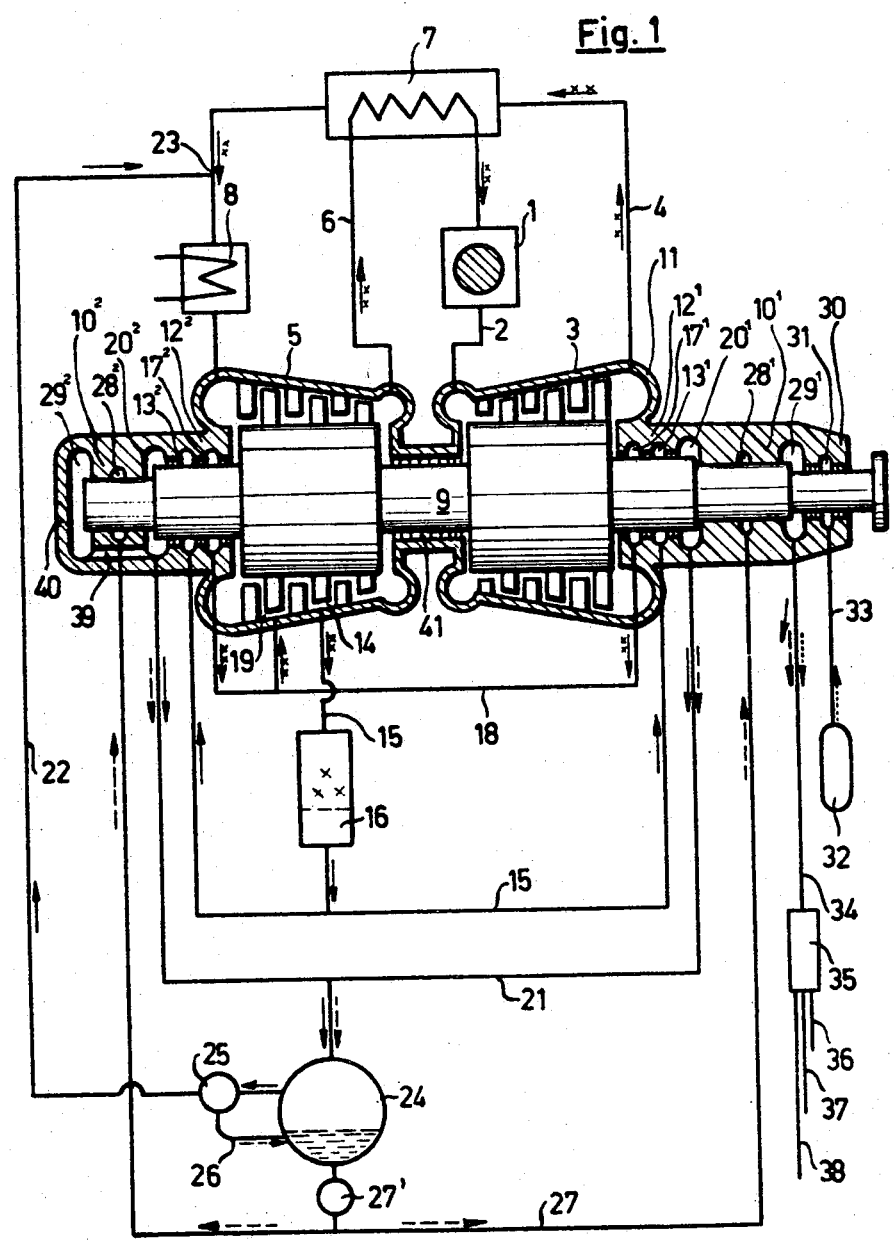

This invention relates to a device for sealing the shaft of a turbomachine for thermal power plants, in which a gaseous working medium is cycled under pressure above atmospheric, being heated by heat supplied in a nuclear reactor, expanded in at least one turbine and compressed again in at least one turbocompressor, with a labyrinth gland situated between the working-medium space of the turbomachine and a bearing of the shaft, the said labyrinth gland being supplied with a packing medium.

In a known machine of this kind, the packing medium used for the gland is a liquid, which is capable of absorbing the fission products, and is not itself decomposed by the action of the radioactive radiation of the fission products. In this case, a separate packing medium circuit with suitable purifying plant and circulating pumps is necessary. If the machine to be sealed is to be able to operate at different pressure levels, the pressure-medium plant in addition must have pressure regulating means.

In steam turbine plants, it is known to use, as packing medium for the gland, working medium bled from the turbine. Since, however, small amounts of the packing steam escape to the outside, sealing by means of packing steam cannot be carried out in the case of radioactively contaminated working medium.

In a machine possibly carrying radioactively contaminated working medium, it is known to use a packing medium consisting of the same fundamental substance as the working medium, but originating from a source completely separate from that of the working medium. The packing medium entering the working-medium space of the machine from the gland causes an increase in the quantity of working medium, which is undesirable in the case of a machine operating on closed cycle. If the machine operates at different pressure levels, it is again necessary to provide pressure-regulating means for the packing medium.

It is the purpose of this invention to avoid the drawbacks described. In a device of the kind described at the beginning, for this purpose according to the invention, a packing chamber of the labyrinth gland is connected to a point of the working-medium space of the turbocompressor by means of an extraction conduit, in which is incorporated an isotope trap, i.e. an isotope separating device, so that from the packing chamber, purified working medium as packing medium flows through the labyrinth gaps toward the working-medium space of the turbomachine as well as toward the shaft bearing. In this way, only purified working medium escapes to the shaft bearing, and working medium originating only from the turbomachine flows to the working-medium space of the turbomachine. If the packing medium flowing to the shaft bearing is returned to the working-medium circuit of the turbomachine, the quantity of cycled working medium remains constant. In addition, the pressure in the gland adapts itself automatically to the pressure level of the working-medium circuit.

The drawings, with reference to which the invention will be explained more fully, show in simplified manner embodiment examples of the subject of the invention.

FIG. 1 shows a diagrammatic representation of a thermal power plant with the sealing device according to the invention, FIG. 2 shows a diagrammatic part representation of a plant extended somewhat in comparison with the plant shown in FIG. 1.

The thermal power plant shown in FIG. 1 has a nuclear reactor 1. From the latter, a conduit 2 leads the working medium to the inlet side of a turbine 3. A conduit 4 leads from the outlet side of the turbine 3 to the inlet side of the turbocompressor 5, and a conduit 6 connects the outlet side of the turbocompressor 5 to the nuclear reactor 1. Inserted in the conduit 4 is a heat-exchanger 7, the other side of which is formed by part of the conduit 6. In front of the inlet to the turbocompressor 5 a cooler 8 is interposed in the conduit 4. The rotor of the turbine 3 and the rotor of the turbocompressor 5 are on a common shaft 9, which is journalled in shaft bearings $10^1$ and $10^2$ of the housing 11 of the turbomachine. Between the working-medium space of the turbine 3 and the shaft bearing $10^1$ is a labyrinth gland $12^1$. Between the working-medium space of the turbocompressor 5 and the shaft bearing $10^2$ is a labyrinth gland $12^2$.

A packing chamber $13^1$ of the labyrinth gland $12^1$ is connected by an extraction conduit 15 to a point 14 of the working-medium space of the turbocompressor 5. Included in the extraction conduit 15 is an isotope-separating device 16, so that purified working medium, that is to say, pure helium flows as packing medium from the packing chamber $13^1$ through the labyrinth gaps not only to the working-medium space of the turbomachine, i.e. the turbine 3, but also to the shaft bearing $10^1$.

The labyrinth part situated on the turbomachine side of the packing chamber $13^1$ has another packing chamber $17^1$, which is connected by a connecting conduit 18 to a point 19 of the working-medium space of the turbocompressor 5 which is at a lower pressure than the extraction point 14. The labyrinth gap situated on the shaft-bearing side of the packing chamber $13^1$ opens into a discharge chamber $20^1$, which is connected by way of a discharge conduit 21 and a return conduit 22 to a point 23 of the conduit 4, that is to say, to a point of the low-pressure part of the working-medium circuit.

The discharge chamber $20^1$ also serves as discharge for lubricant of the shaft bearing $10^1$. Accordingly, there is inserted between the discharge conduit 21 and the return conduit 22 a lubricant container 24, serving for storage of the oil for the shaft bearing, and for the separation of oil from working medium. Incorporated in the return conduit 22 for the working medium, branching off the lubricant container 24, is furthermore a lubricant-vapour separator 25. From the latter, a conduit 26 for the separated lubricant leads to the lubricant container 24. A lubricant conduit 27, incorporating a lubricant pump 27', leads from the lubricant container 24 to a chamber $28^1$ of the shaft bearing $10^1$.

On the side of the shaft bearing $10^1$ remote from the turbomachine, i.e. turbine 3 is a discharge chamber $29^1$ and following this an outer labyrinth gland 30 with a packing chamber 31. The outer labyrinth gland 30 seals the exit of the shaft 9 from the housing 11 from the surroundings of the turbomachine. Opening into the packing chamber 31 is a supply conduit 33 coming from a source 32 supplying a packing medium, i.e., nitrogen. The discharge chamber $29^1$ opens into a discharge conduit 34 leading to a separating device 35. For the substances separated in the latter, that is to say, lubricant of the bearing $10^1$, packing medium of the outer labyrinth gland 30 and traces of the purified working medium serving as packing medium, respective discharge conduits 36, 37, 38 are provided.

The labyrinth gland $12^2$ situated on the other side of the turbomachine is constructed in correspondence with the labyrinth gland $12^1$ described. It accordingly has a packing chamber $13^2$, which is connected to the part of the extraction conduit 15 situated in the direction of flow of the packing medium to the isotope-separating device 16. The labyrinth gland $12^2$ also has a further packing chamber $17^2$, to which the connecting conduit 18 is connected. Also on the shaft-bearing side of the labyrinth gland $12^2$ is a discharge chamber $20^2$ opening into the discharge conduit 21. On the side of the shaft bearing $10^2$ remote from the turbomachine is a further discharge conduit $29^2$ connected by a passage 39 to the discharge chamber $20^2$. The shaft bearing $10^2$ has a chamber $28^2$ connected to the lubricant conduit 27. The housing 11 and with it the discharge chamber $29^2$ is closed gas-tight by a wall 40 from the surroundings of the turbomachine.

On the side of the shaft exit, the shaft bearing $10^1$ forms a further gland with lubricant as packing medium, continuing the labyrinth gland $12^1$, and the outer gland 30 forms a gland again continuing the two glands $12^1$ and $10^1$.

In addition, between the turbine 3 and turbocompressor 5, there is provided a labyrinth seal 41, sealing the passage of the shaft 9 in respect to the housing 11.

The thermal power plant operates in known manner as follows: the working medium heated in the nuclear reactor 1 flows through the conduit 2 into the turbine 3, where it expands while performing work on the shaft 9. The expanded working medium flows in the conduit 4 first to the heat-exchanger 7, in which it gives off part of its heat to the working medium flowing to the reactor 1 in the conduit 6. From the heat-exchanger 7, the working medium from the turbine passes further into the cooler 8, where it is cooled further by cooling water, and is then recompressed in the turbocompressor 5. The compressed working medium flows in the conduit 6 with heat absorption already described in the heat-exchanger 7 to the nuclear reactor, whereby the working medium circuit is closed.

The sealing device according to the invention operates as follows: At the extraction point 14 of the turbocompressor 5, radioactively contaminated helium is extracted from the working medium circuit, and is purified in the isotope separator 16, so that pure helium enters the packing chambers $13^1$ and $13^2$. This pure helium then leaves the packing chambers $13^1$, $13^2$ through the labyrinth gaps in opposite directions. The part of the pure helium flowing toward the turbomachine enters the packing chambers $17^1$ and $17^2$, where it mixes with the radioactive helium of the connecting conduit 18 under somewhat lower pressure and returns to the working-medium circuit of the thermal power plant again, partly through the labyrinth gap situated on the turbomachine side of the packing chambers $17^1$, $17^2$, and partly through the connecting conduit 18. The part of the pure helium flowing from the packing chambers $13^1$ and $13^2$ directed away from the interior of the turbomachine enters the discharge chambers $20^1$ and $20^2$. The pure helium, together with the lubricant escaping from the shaft bearings into the discharge chambers $20^1$, $20^2$, flows through the discharge conduit 21 into the lubricant container 24. The lubricant collecting in the lower part of the lubricant container 24 is raised to pressure by means of the lubricant pump 27', and is supplied through the lubricant conduit 27 to the chambers $28^1$ and $28^2$ of the shaft bearings $10^1$, $10^2$ as bearing lubricant. The pure helium collecting in the upper part of the lubricant container 24, if necessary assisted by a circulating pump, not shown, after it has left any still adherent oil traces behind in the lubricant-vapour separator 25, flows to the point 23 of lower pressure of the working-medium circuit.

In this way, the shaft bearings $10^1$ and $10^2$ or their lubricant come into contact only with pure helium, so that ordinary lubricating oil may be used as lubricant. All the working medium, extracted from the working-medium circuit, for sealing the shaft returns to the working-medium circuit again, so that the quantity of working medium in the working-medium circuit of the thermal power plant remains constant and escape of helium to the outside is prevented.

If the electrical machine driven by the turbomachine had a gas-tight housing, connected in a gas-tight manner to the housing 11 of the turbomachine and filled with helium, the sealing of the machine described in the preceding paragraph but one, that is to say sealing of the shaft bearings relative to the radioactively contaminated helium of the turbomachine, would be adequate. In the embodiment example shown, however, the shaft end journalled in the shaft bearing $10^1$ passes out of the housing 11 of the turbomachine into the atmosphere. The packing medium, namely nitrogen, coming from the source 32, seals the gap between the shaft 9 and the housing 11 from the atmosphere, the nitrogen flowing from the chamber 31 of the labyrinth gland 30 partly to the atmosphere and partly into the discharge chamber $29^1$. The part of the nitrogen passing into the discharge chamber $29^1$ comes together with the part of the lubricant of the shaft bearing $10^1$ entering this discharge chamber. In contrast to the shaft bearing $10^2$, in which the two sides of the bearing are connected together by the passage 39, the shaft bearing $10^1$ is constructed as a gland between the discharge chambers $20^1$ and $29^1$. From the chamber $28^1$ of the shaft bearing $10^1$, lubricant flows on the one hand to the discharge chamber $20^1$, and on the other hand lubricant flows to the discharge chamber $29^1$, whereby the discharge chambers $20^1$ and $29^1$ are sealed from each other.

Lubricant and nitrogen mainly pass into the discharge conduit 34 of the chamber $29^1$, but very small traces of pure helium could still be contained in the lubricant. The three components are separated from each other in the separator 35. The nitrogen is separated through the conduit 36, the oil can be returned through the discharge conduit 37 by means of a pump into the lubricant container again, the extremely small quantities of helium flowing out in the discharge conduit 38 may be passed to the helium container of the thermal power plant or periodically to the circuit of the working medium.

For better legibility of the drawing, arrows have been marked against the conduits, solid-line arrows indicating pure helium, solid-line arrows provided with crosses indicating radioactively contaminated helium, dashed line arrows indicating lubricating oil, and dotted arrows nitrogen.

The part representation according to FIG. 2 shows a part of another thermal power plant, said part corresponding to the left-hand part of FIG. 1, which instead of the single-stage turbocompressor 5 shown in FIG. 1 has a compressor with two stages $5^1$ and $5^2$, the shaft 9 being extended by a shaft part 9′, and a further shaft bearing 10⁴ being provided on the free end of the shaft part 9′. A shaft bearing situated between the two stages 5¹ and 5² is denoted by 10³. The shaft bearing 10³ is sealed from the compressor stage 5² by the labyrinth gland 12², and from the compressor stage 5¹ by the labyrinth gland 12³. The shaft bearing 10⁴ situated on the free shaft end, and a labyrinth gland 12⁴ sealing from the stage 5¹ correspond in all details to the shaft bearing 10² and the labyrinth gland 12² according to FIG. 1, that is to say, they have a chamber 28⁴ for the lubricant supplied, discharge chambers 20⁴ and 29⁴ and packing chambers 13⁴ and 17⁴. The labyrinth glands 12² and 12³ have packing chambers 13² and 13³, which like the packing chamber 13⁴, are connected to the extraction conduit 15, and carry pure helium, which flows again from the packing chambers in opposite directions through the adjoining labyrinth gaps. In the respective compressor-side part of the labyrinth glands 12³ and 12³, packing chambers 17² and 17³ are again respectively provided, and like the packing chamber 17⁴, open into the connecting conduit 18.

The discharge chambers 20² and 20³, arranged on either side of the shaft bearing 10³, correspond, like the discharge chamber 20⁴, to the discharge chambers 20¹ and 20² according to FIG. 1 and accordingly open into the discharge conduit 21. The chamber 28³ of the shaft bearing 10³ and the chamber 28⁴ of the shaft bearing 10⁴ are connected to the lubricating oil conduit 27.

Whereas in the embodiment shown in FIG. 1, both turbomachine parts, that is to say, the turbine 3 and turbocompressor 5 have their low-pressure sides facing the labyrinth glands 12¹ and 12², respectively, in the embodiment example according to FIG. 2, the high-pressure side of stage 5¹ of the turbocompressor faces the labyrinth gland 12³.

Corresponding to the subdivision of the turbocompressor into the two stages 5¹ and 5², the conduit 4 for the working medium of the thermal power plant and coming from the heat exchanger 7 first leads through a cooler 8¹ to the low-pressure side of the compressor stage 5¹ and a conduit 4′ leads from the high-pressure side of the compressor stage 5¹ through a cooler 8² to the low-pressure side of the compressor stage 5². The conduit 6 starts from the high-pressure side of the compressor stage 5².

What is claimed is:

1. In a nuclear thermal power plant having a closed circuit for a gaseous working medium; an atomic nuclear reactor for heating said working medium; turbomachines including a compressor and a turbine incorporated in said working medium circuit; said turbomachines having a pressure tight housing confining a working space for said working medium; a rotor having a shaft, arranged for rotation in said housing; a lubricant system comprising a bearing mounted in gas tight relation to said housing and having said shaft journaled therein; a labyrinth gland for said shaft, mounted in gas tight relation to said housing and situated between said working medium space and said bearing; a first annular chamber axially subdividing said labyrinth gland into two parts; a second annular chamber positioned between said first chamber and said bearing; an extraction conduit for leading part of said working medium from an extraction point of said working space of said compressor into said first chamber; said extraction point being so arranged that said working medium flows from said first chamber toward said working space of the turbomachines as well as toward said bearing; an isotope trap incorporated in said extraction conduit to permit flow of the extracted part of said working medium but prevent flow of isotopes which may be admixed therewith into said first chamber; a discharge conduit leading from said second chamber to a point of said working medium circuit at which lower pressure prevails than in said second chamber; and a lubricant trap incorporated in said discharge conduit to permit working medium flow but prevent flow of lubricant from said lubricant system into said working medium circuit.

2. The combination defined in claim 1, in which a third annular chamber is provided in said labyrinth part situated at the working medium space side of said first chamber; a conduit connecting said third chamber to the working medium space of said compressor at a point at which lower pressure prevails than in said extraction conduit.

3. The combination defined in claim 1, in which said shaft projects from said housing of said turbomachines; an outer labyrinth gland mounted in gas tight relation to said housing, situated on the side of said bearing remote from said turbomachines; a fourth annular chamber provided in said outer labyrinth gland; a source of a packing medium for the supply of a packing medium to said fourth chamber at a pressure sufficient to cause flow of packing medium from said fourth chamber toward said bearing as well as toward the surroundings of said housing.

4. The combination defined in claim 3, in which said working medium of said turbomachines is helium, said lubricant of said bearing is lubricating oil, and said packing medium for said outer labyrinth gland is nitrogen.

References Cited

UNITED STATES PATENTS

| | | | |
|---|---|---|---|
| 2,299,119 | 10/1942 | Yeomans | 308—36.3 X |
| 2,314,207 | 3/1943 | Grobel | 308—36.3 X |
| 2,407,807 | 9/1946 | Bentley | 308—36.3 X |
| 3,158,002 | 11/1964 | Spillman | 176—60 X |

REUBEN EPSTEIN, *Primary Examiner.*